United States Patent [19]

Shibaguchi et al.

[11] Patent Number: 5,402,154
[45] Date of Patent: Mar. 28, 1995

[54] OPTICAL RECORDING SYSTEM CAPABLE OF CHANGING THE BEAM SIZE

[75] Inventors: Takashi Shibaguchi, Yokohama; Hiroyoshi Funato, Chigasaki, both of Japan

[73] Assignee: Ricoh Company, Ltd., Tokyo, Japan

[21] Appl. No.: 925,858

[22] Filed: Aug. 7, 1992

Related U.S. Application Data

[63] Continuation-in-part of Ser. No. 826,618, Jan. 28, 1992, abandoned.

[30] Foreign Application Priority Data

Jan. 29, 1991 [JP] Japan .................. 3-029318
Mar. 13, 1991 [JP] Japan .................. 3-048361
Jan. 29, 1992 [JP] Japan .................. 4-014288

[51] Int. Cl.[6] ............................ B41J 2/435
[52] U.S. Cl. ................................ 347/256
[58] Field of Search ............... 346/1.1, 107 R, 76 L, 346/108, 160; 358/296, 300, 302; 359/250

[56] References Cited

U.S. PATENT DOCUMENTS

| | | |
|---|---|---|
| 2,163,550 | 6/1939 | Clothier et al. |
| 3,168,611 | 2/1965 | Strauss . |
| 3,953,810 | 4/1976 | Veilex . |
| 4,318,591 | 3/1982 | Elterman . |
| 4,514,056 | 4/1985 | Azgapetian . |
| 4,707,081 | 11/1987 | Mir . |
| 4,746,942 | 5/1988 | Moulin .................. 354/5 |
| 4,802,741 | 2/1989 | Kaukeinen . |
| 4,854,678 | 8/1989 | Kitano et al. . |
| 4,887,104 | 12/1989 | Kitano et al. . |
| 4,915,481 | 4/1990 | Gilligan et al. ........... 359/250 |
| 4,932,761 | 6/1990 | Shingaki et al. . |
| 4,993,811 | 2/1991 | Blazey et al. . |
| 5,020,885 | 6/1991 | Shibaguchi . |
| 5,033,806 | 7/1991 | Tomita et al. . |
| 5,124,835 | 6/1992 | Shibaguchi et al. . |
| 5,140,454 | 8/1992 | Shibaguchi . |

FOREIGN PATENT DOCUMENTS 375725 3/1991 Japan .

*Primary Examiner*—Mark J. Reinhart
*Attorney, Agent, or Firm*—Oblon, Spivak, McClelland, Maier, & Neustadt

[57] ABSTRACT

An optical shutter device comprises an electro-optic layer of a material that shows the electro-optic Kerr effect, an array of shutter regions defined on the electro-optic layer for controlling a passage of an optical beam through the layer, a plurality of electrodes provided on the electro-optic layer in correspondence to the shutter regions for applying a predetermined electric field upon energization, a driver circuit connected to each pair of the electrodes for energizing the same independently from each other, a biasing circuit connected to the plurality of electrodes for applying a predetermined d.c. bias voltage thereto, a switching circuit for inverting the polarity of the d.c. bias voltage, a first polarizing device provided above the electro-optic layer for causing a rotation of the polarizing plane of the optical beam in a first angular direction, and a second polarizing device provided below the electro-optic layer for causing a rotation of the polarizing plane of the optical beam in a second, opposite angular direction.

17 Claims, 14 Drawing Sheets

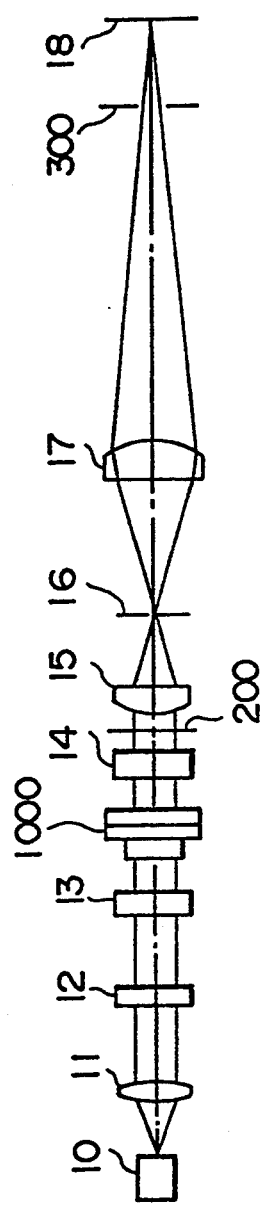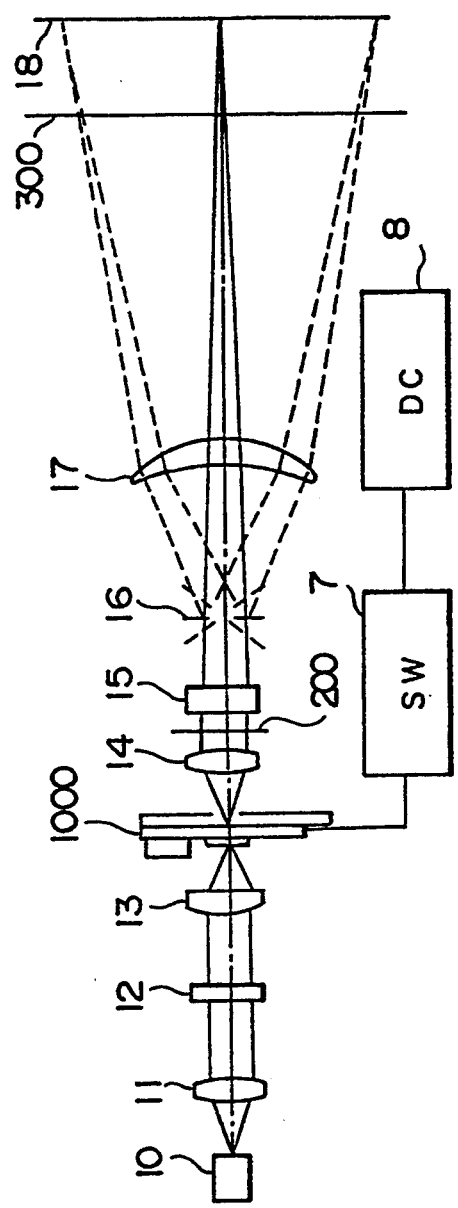
FIG. 14A
FIG. 14B

FIG. 17A
FIG. 17B
FIG. 17C
FIG. 17D
FIG. 17E
FIG. 17F
FIG. 17G
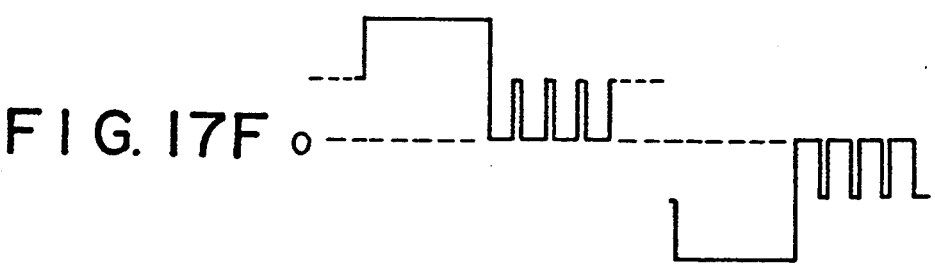

FIG. 18D

OPTICAL RECORDING SYSTEM CAPABLE OF CHANGING THE BEAM SIZE

This application is a continuation-in-part of U.S. application Ser. No. 07/826,618, filed Jan. 28, 1992, now abandoned.

BACKGROUND OF THE INVENTION

The present invention generally relates to the optical recording of images and more particularly to an optical recording system for recording an image on a recording medium by means of an optical beam.

In the facsimiles and copiers, the optical recording system is used commonly. In the optical recording system, an image is recorded on the surface of a recording medium such as a recording sheet or photosensitive drum by means of a finely focused optical beam.

In the recent optical recording systems, there is a demand of graded optical recording for forming half-tone images and pictures such as photographs with excellent quality. In order to achieve such a graded recording, it is necessary to change the size of the pixels and hence the size of the optical beam used for recording.

Conventionally, an optical device is proposed for this purpose in the Japanese Laid-open Patent Application 3-75725, wherein the size of the beam can be changed. According to the foregoing prior art device, a plurality of minute apertures are formed on a crystal plate that shows the electro-optic Kerr effect. The apertures are arranged in the vertical scanning direction and activated independently from each other by applying an electric field. Upon activation, the plane of polarization of the optical beam passing through the aperture is caused to rotate as a result of the electro-optic Kerr effect. By providing polarizers at both sides of the crystal, one can control the passage of the optical beam through each of the apertures independently. In other words, each aperture acts as an optical shutter for allowing or prohibiting the passage of the optical beam therethrough. Thereby, the size of the beam of the optical beam can be changed during the horizontal scanning process.

After intensive effort to develop the optical recording system that uses the foregoing optical device, it was discovered that the function of the optical switching is degraded with time when the device is used continuously. More specifically, the passage or interruption of the optical beam by the device becomes no longer complete after a continuous use of the device. This effect is called optical drift. Further, the foregoing conventional optical device has a problem in that the diffraction of the optical beam tends to occur at the edge of the apertures. When such a diffraction occurs, the quality of the recorded image is inevitably deteriorated due to the unwanted exposure. In addition, the conventional optical device has suffered from a problem that the characteristics of the device tend to be changed when the temperature of the crystal plate is changed. When such a fluctuation of the optical property has occurred, the optical recording system no longer operates properly.

SUMMARY OF THE INVENTION

Accordingly, it is a general object of the present invention to provide a novel and useful optical recording system, wherein the foregoing problems are eliminated.

Another and more specific object of the present invention is to provide a variable aperture device for an optical recording system for changing the size of an optical beam used for optical recording, wherein the operation of the variable aperture device is stabilized even after a continuous operation for a prolonged time period.

Another object of the present invention is to provide an optical recording system for recording an image on a recording medium while changing the size of an optical beam used for optical recording, wherein the diffraction of the optical beam caused by the variable aperture device is eliminated.

Another object of the present invention is to provide a process for controlling the passage of an optical beam through a variable aperture device that uses an electro-optic device for controlling the passage of the optical beam therethrough.

Another object of the present invention is to provide an optical shutter device for controlling a passage of an optical beam, comprising: an electro-optic layer of a material that shows an electro-optic effect, said layer having upper and lower major surfaces and causing a rotation of the polarizing plane in response to an application of a voltage; an array of shutter regions defined on said electro-optic layer for controlling a passage of an optical beam through said layer, each of said shutter regions controlling the passage of the optical beam by inducing the electro-optic effect therein in response to an application of an electric field that acts across said shutter region in a predetermined direction; a plurality of electrodes provided on one of the upper and lower major surfaces of said electro-optic layer in correspondence to said plurality of shutter regions, said plurality of electrodes being arranged to form a number of electrode pairs each defining said passage region therebetween, said electrode pairs being separated from each other and applying said electric field independently from each other upon energization; driver means connected to each of the electrode pairs for energizing the electrode pair independently from other electrode pairs; biasing means connected to the plurality of electrode pairs for applying a predetermined d.c. bias voltage thereto with a predetermined polarity; switching means for inverting the polarity of the d.c. bias voltage that is applied to the electrode pairs; first polarizing means provided above the upper major surface of the electro-optic layer for setting the polarizing plane of the optical beam passing therethrough at a first angular direction; and second polarizing means provided below the lower major surface of said electro-optic layer for setting the polarizing plane of the optical beam passing therethrough at a second, opposite angular direction. According to the present invention, the formation of space charges in the crystal layer as a result of trapping and accumulation of photocarriers under the presence of the electric field is avoided by periodically inverting the polarity of the d.c. bias voltage. Thereby, the undesirable effect of canceling-out of the applied electric field by the space charges that are induced in the crystal layer, is effectively eliminated, and excellent control of the passage of the optical beam through the apertures is achieved even when the variable aperture device is operated continuously for a prolonged time period. By controlling the apertures individually, one can change the overall size of the optical beam that has passed through the variable aperture device.

Another object of the present invention is to provide an optical recording system for recording an image on a recording medium by means of an optical beam that is deflected repeatedly in a horizontal scanning direction, comprising: beam source means for producing an optical beam with a polarizing plane that intersects with the horizontal scanning direction by an angle of 45 degrees in a first angular direction; a first optical system provided in a path of the optical beam that has been produced by the beam source for focusing the same at a first focal point to form an elongated optical beam having an elongated beam shape elongating in a vertical scanning direction that is perpendicular to said horizontal scanning direction; shutter array means provided in correspondence to a first focal point, said shutter array means comprising a plurality of apertures aligned in said vertical scanning direction and are activated independently for selectively passing the optical beam therethrough upon activation; a second optical system provided in a path of the optical beam that has passed through the shutter array means for focusing the same at a second location to form an elongated optical beam having an elongated beam stop elongating in said horizontal scanning direction; deflection means for deflecting the optical beam that has passed through the second optical system repeatedly in said horizontal scanning direction; a third optical system provided in a path of the optical beam that has been deflected by the deflection means for focusing the same on a recording surface of the recording medium; and a slit element provided on a path of the optical beam that has exited from the second optical system, said slit element carrying a slit extending in the horizontal scanning direction with a width set to eliminate diffraction beams that are formed when the optical beam has passed through the shutter array means for the diffraction higher than the first order. According to the present invention, one can eliminate the unwanted optical beam that has been produced as a result of the diffraction of the optical beam at the apertures of the variable aperture device. Thereby, the quality of recording on the recording medium is improved substantially.

Other objects and further features of the present invention will become apparent from the following detailed description when read in conjunction with the attached drawings.

BRIEF DESCRIPTION OF THE DRAWINGS

FIGS. 14(A) and 14(B) are diagrams showing the optical recording system that uses the variable aperture device of FIGS. 13(A) and 13(B);

FIGS. 17(A)–17(G) are diagrams showing the timing chart for driving the optical recording system with the variable aperture device according to another embodiment of the present invention; and FIGS. 18(A)–18(G) are diagrams showing the timing chart for driving the optical recording system with the variable aperture device according to still other embodiment of the present invention.

DETAILED DESCRIPTION OF THE PREFERRED EMBODIMENTS

Figures 1A, 1B:
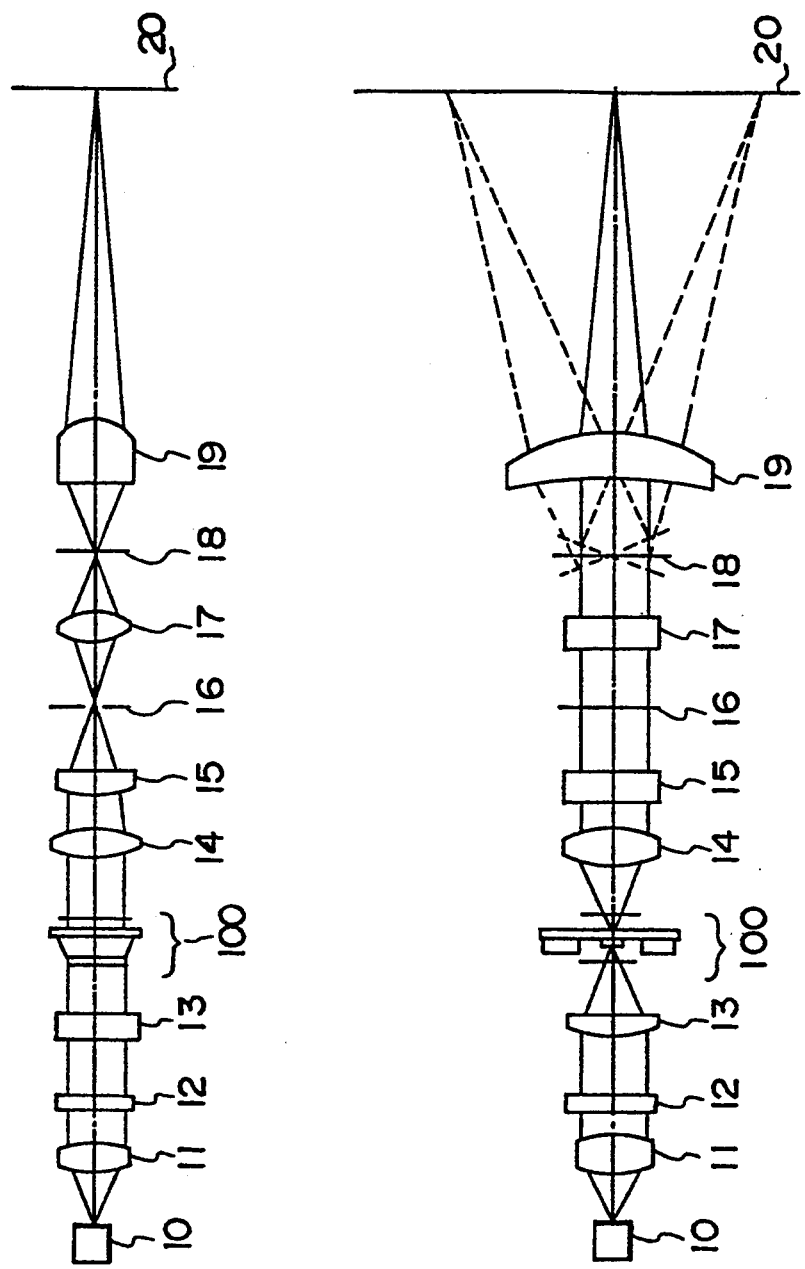
FIGS. 1(A) and 1(B) are diagrams showing the construction of the optical recording system according to a first embodiment of the present invention respectively in a side view and a plan view.

FIGS. 1(A) and 1(B) show a first embodiment of the optical recording system of the present invention, wherein FIG. 1(A) shows the side view and FIG. 1(B) shows the plan view. In the side view of FIG. 1(A), the optical beam is deflected perpendicularly to the plane of the drawing in response to the horizontal scanning, while in the plan view of FIG. 1(B), the optical beam is moved within the plane of the drawing in response to the horizontal scanning of the optical beam.

Referring to the drawings, an optical source 10 produces a polarized optical beam that is converted to a parallel optical beam by a coupling lens 11. The optical beam thus produced may have the plane of polarization that is substantially parallel to the horizontal scanning direction. The parallel optical beam is then passed through a half-lambda plate 12 wherein the plane of polarization is rotated by the angle of 45 degrees with respect to the initial polarizing plane. Thereby, the optical source 10, the lens 11 and the half-lambda plate 12 form an beam source.

The optical beam thus produced with the predetermined polarization then enters to a cylindrical lens 13 that focuses the optical beam to form a flat optical beam having an elongating beam shape that extends in the vertical scanning direction. Thereby, the optical beam is focused at a focal point of the lens 13. See FIG. 1(B). At the focal point, there is provided a variable aperture device 100 carrying thereon a number of apertures that are arranged in the vertical scanning direction. As will be explained detail in later, the device 100 forms one of the essential elements of the present invention and used to change the size of the optical beam.

The optical beam passed through the variable aperture device 100 enters to a lens 14 that forms a parallel optical beam when viewed in the plane parallel to the horizontal scanning direction as shown in FIG. 1(B). The optical beam passed through the lens 14 then enters to a cylindrical lens 15 that focuses the optical beam incident thereto within the plane parallel to the vertical scanning direction as shown in FIG. 1(A). Thereby, the optical beam is focused at a position where a slit 16 is provided in the form of an elongated optical beam having an elongating beam shape extending in the horizontal scanning direction. The slit 16 forms another essential part of the present invention and used to eliminate the diffraction of the optical beam higher than the first order. It should be noted that the diffraction of the optical beam is caused when the optical beam passes through the variable aperture device 100.

The optical beam passed through the slit 16 then enters to a cylindrical lens 17 that focuses the optical beam in the plane parallel to the vertical scanning direction as shown in FIG. 1(A). As a result, an elongated image of optical beam extending in the horizontal scanning direction is formed on a reflection surface of a rotary polygonal mirror 18.

The rotary polygonal mirror 18 deflects the optical beam incident thereto as usual, and the optical beam thus deflected is focused on a recording surface 20 of a recording medium such as a photosensitive drum or photosensitive sheet after passing through a fθ-lens 19. As will be explained later, the size of the optical beam that is focused on the recording surface 20 is changed by the variable aperture device 100, and a graded recording of image is achieved thereby.

Next, the variable aperture device 100 will be explained in detail.

Referring to FIGS. 2(A)-2(D) showing an embodiment of the variable aperture device 100, the device 100 includes a PLZT layer 1 that shows the electro-optic Kerr effect, drive circuits 2A and 2B for inducing the electro-optic Kerr effect in the PLZT layer 1, a ceramic substrate 3 provided with a slit 3A for passing an optical beam therethrough and for supporting the PLZT layer 1 and the drive circuits 2A and 2B thereon, an analyzer 5 provided on a lower major surface of the substrate 3, and a polarizer 4 provided above the PLZT layer 1.

Figure 2A:
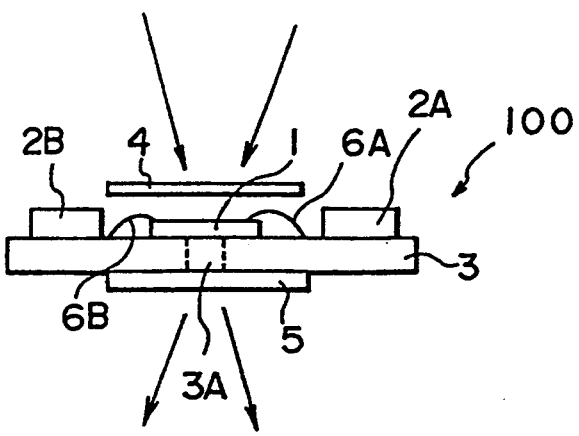
FIGS. 2(A)–2(D) are diagrams showing an embodiment of the variable aperture device that is used in the optical recording system of the present invention.
Figure 2B:
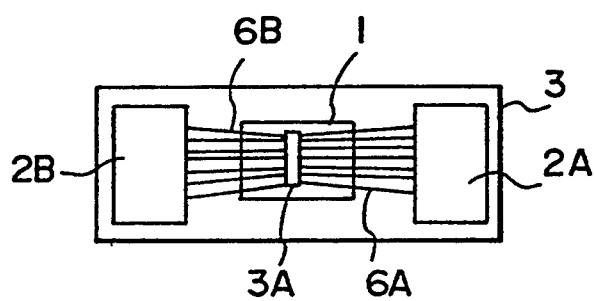
Figure 2C:
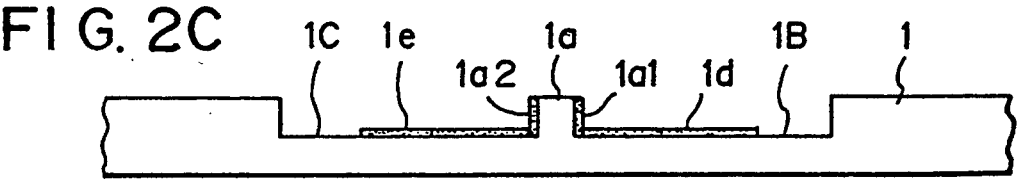
Figure 2D:
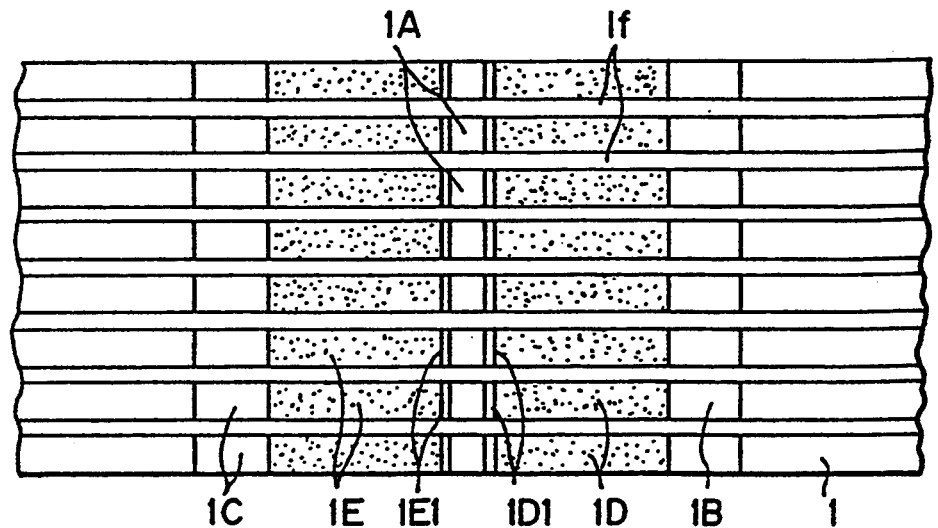

FIGS. 2(C) and 2(D) show the PLZT layer 1 in detail. Referring to the drawings, the PLZT layer 1 has a thickness of 400 μm and has optically polished upper and lower major surfaces. Further, grooves 1B and 1C are formed on the upper major surface of the PLZT layer 1 to extend parallel with each other with a separation of about 100 μm. The grooves 1B and 1C have a depth of about 200 μm and extend perpendicular to the plane of FIG. 2(C).

The grooves 1B and 1C form an intervening region 1a therebetween for passing the optical beam. The region 1a has a width of about 100 μm and extends vertically to the plane of FIG. 2(C). As the grooves 1B and 1C are formed at both sides of the region 1a, the region 1a projects in the upward direction. The grooves 1B and 1C may extend laterally with the width of 1 mm or more. Further, the grooves may reach the lateral edge of the PLZT layer 1.

On the respective bottom surfaces of the grooves 1B and 1C, electrodes 1d and 1e of the NiCr:Al alloy are deposited by sputtering such that the electrodes 1d and 1e have portions $1a_1$ and $1a_2$ that cover the side walls of the projection 1a.

After the projection 1a and the electrodes 1d and 1e are thus formed, a number of grooves if are formed to extend in the direction perpendicular to the elongating direction of the projection 1a with a pitch of about 100 μm. Each groove if may have a width of 20 μm and a depth of 250 μm. As a result of the formation of the grooves 1f, the elongated projection 1a is divided into a number of generally square projections 1A that has a lateral dimension of 100 μm × 100 μm. It will be understood that the projections 1A are aligned in the elongating direction and act as the aperture for passing the optical beam therethrough. Further, the electrodes 1d and 1e are also divided into a number of strip electrodes 1D and 1E as a result of the formation of the grooves 1f. There, the electrode strip 1D and the electrode strip 1E are located at both lateral sides of the projection 1A and side wall electrodes $1D_1$ and $1E_1$ cover the side walls of the projection 1A in correspondence to the electrode portions $1a_1$ and $1a_2$. It should be noted that such electrodes $1D_1$ and $1E_1$ form an electric field in the intervening projected region 1A along the direction connecting these electrodes when an electric voltage is applied across the electrodes 1D and 1E.

The PLZT layer 1 thus carrying the projections 1A and the corresponding electrodes 1D and 1E are provided on the ceramic substrate 3 such that the projections 1A are aligned with the slit 3A formed in the substrate 3. Further, the drive circuits 2A and 2B are mounted on the upper major surface of the substrate 3 and connected to the electrodes 1D and 1E by bonding wires 6A and 6B. See FIGS. 2(A) and 2(B). Further, the analyzer 5 is attached to the lower major surface of the substrate 3 by an adhesive and the polarizer 4 is held above the PLZT layer 1 by suitable means. Thereby, the polarizer 4 and the analyzer 5 have respective polarizing planes that are perpendicular with each other. More specifically, the polarizer 4 may have the polarizing plane that is rotated by an angle of 45 degrees with respect to the direction of the electric field applied across the projection 1A while the analyzer 5 may have the polarizing plane that is rotated by an angle of −45 degrees with respect to the direction of the electric field, or vice versa.

When a laser beam having the intensity of $I_i$ is incident to the projected aperture 1A of the variable aperture device 100 described above with the plane of polarization coincident to the plane of polarization of the polarizer 4 under the presence of the electric field E acting across the aperture 1A, the intensity $I_o$ of the output optical beam is represented as a function of the phase difference $\Gamma$ as $$I_0 = I_i \sin^2(\Gamma/2), \tag{1}$$

where $\Gamma$ is represented as $$\Gamma = (\pi/\lambda) \cdot t \cdot n_0^3 \cdot R_c E^2,$$

in which λ represents the wavelength of the optical beam, t represents the thickness of the PLZT layer 1 at the aperture 1A, $n_o$ represents the refractive index of the PLZT layer 1, and $R_c$ represents the second-order electro-optic constant.

As shown in Eq. (1), the intensity $I_o$ of the output optical beam assumes the maximum or minimum when the phase difference $\Gamma$ is equal to an integer multiple of $\pi$, or $m\pi$ where m is an integer. For the odd integers for the parameter m, the intensity $I_o$ becomes maximum while for the even integers for the parameter m, the intensity $I_o$ becomes minimum. Thus, the odd integer m corresponds to the state in which the aperture 1A is opened. On the other hand, the even integer m corresponds to the state in which the aperture 1A is closed. By controlling the electric field E such that the phase difference $\Gamma$ is equal to the odd or even integer of $\pi$ for each of the apertures 1A independently, it is possible to control the beam size of the optical beam that has passed through the variable aperture device 100.

Hereinafter, the change of the beam size achieved by the variable aperture device 100 will be described in detail.

Figure 3A:
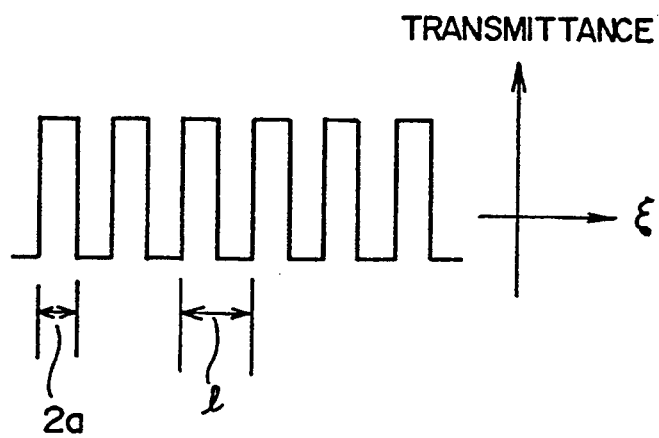
FIGS. 3(A)–3(C) are diagrams for explaining the principle of the beam shape change that is achieved by the variable aperture device of FIG. 2(A)–2(C)

Referring to FIG. 3(A) showing the optical transmittance of the device 100 along the axis $\xi$ that is taken coincident to the direction of alignment of the apertures 1A, the overall transmittance $f(\xi)$ is represented as $$f(\xi) = \Sigma F(\xi - ml) \quad (2)$$

where F stands for the optical transmittance distribution of a single aperture 1A in the state that the aperture is opened and l stands for the pitch of the apertures. The summation is taken for the range of m from 0 to $N-1$, wherein N represents the number of the apertures 1A that allow the passage of the optical beam.

Referring to FIGS. 1(A) and 1(B) again, the laser beam that has passed through the variable aperture device 100 has the intensity distribution given by the foregoing Eq. (2) in the direction of the vertical scanning line. It should be noted that the variable aperture device 100 includes the apertures 1A that are aligned in the plane of FIG. 1(B) and hence in the vertical scanning direction of the optical beam. When the optical beam thus formed is focused on the location of the slit 16 by the lenses 14 and 15, a Fraunhofer diffraction of optical beam, caused by the array of apertures 1A, appears in the vertical scanning direction. Such a diffraction pattern is represented analytically by the Fourier transform of the optical intensity distribution given by Eq. (2).

More specifically, the amplitude distribution of the optical beam formed as a result of the Fraunhofer diffraction is represented as $$g(X) = G(X) \cdot \Sigma \exp(-imlX) \quad (3)$$

where G(X) represents the Fourier transform of the function $F(\xi)$ and X represents the spatial frequency at the position of the slit 16. Again, the summation is taken for the apertures 1A that allow the passage of the optical beam.

It should be noted that the summation of the exponential function in the above Eq. (3) is represented as $$\Sigma \exp(-imlX) = \exp[-i(N-1)l/2X]\{\sin(NlX/2)\}/\sin(lX/2)\}. \quad (4)$$

Assuming the diameter of $2a$ for the aperture 1A as shown in FIG. 3(A), the Fourier transform G(X) is represented as $$G(X) = \sin(aX)/aX \quad (5),$$

and the amplitude distribution function g(X) as $$g(X) = [\sin(aX)/aX] \cdot [\{\sin(NlX/2)\}/\{\sin(lX/2)\}] \cdot \exp[-i(N-1)l/2X]. \quad (6)$$

Thus, the optical intensity distribution is given as $$|g(X)|^2 = [\sin(aX)/aX]^2 \cdot [\{\sin(NlX/2)\}/\{\sin(lX/2)\}]^2. \quad (7)$$

It should be noted that Eq. (7) shows that the optical intensity distribution is given as a product of the Fraunhofer pattern of the individual apertures 1A (first term at the right hand side) and the interference pattern of the N apertures (second term at the right hand side).

Figure 3B:
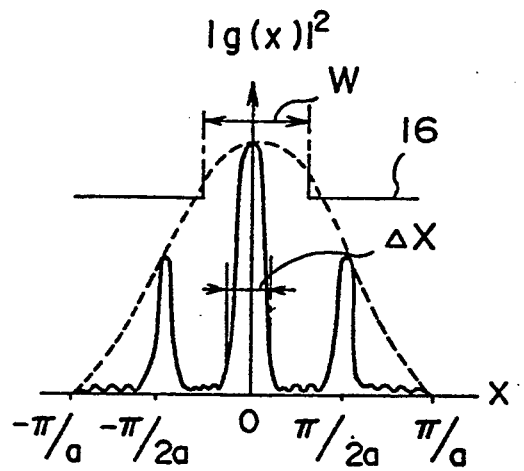

FIG. 3(B) shows the optical intensity distribution for the case where l is set equal to 4a in the vertical scanning direction. The horizontal axis shows the spatial frequency X. The broken line in FIG. 3(B) represents the first term of Eq. 7 while the continuous line represents the optical intensity distribution. The interval between the two adjacent peaks of the optical intensity is $\pi/2a$, while the half width value $\Delta X$ of the principal peak becomes $\pi/2Na$.

As can be seen in FIG. 3(B), the interval between the peaks and hence the diffraction peaks is determined equal to $\pi/2a$ and the parameter a is determined by the radius of the aperture 1A. Thus, by setting the width of the slit 16 in the vertical scanning direction to be slightly smaller than the quantity $\Delta f\pi/a$ (f stands for the synthetic focal length of the lenses 14 and 15), one can effectively eliminate the diffraction beams higher than the first order by the slit 16, even when the variable aperture device 100 causes the diffraction on the optical beam that passes therethrough. It should be noted that the actual width, measured in the vertical scanning direction, of the zeroth diffraction beam, i.e. the optical beam that passes through the slit 16 without interruption, is represented as $$\Delta f \Delta X = \Delta f \pi / 2Na.$$

Referring to the side view of FIG. 1(A) again, the elongated image of the optical beam that is formed at the location of the slit 16 and extending in the horizontal scanning direction of the optical beam, is focused on the reflection surface of the rotary polygonal mirror 18 for deflection in the horizontal scanning direction. The optical beam thus deflected is then focused on the recording surface 20 of the recording medium after passing through the usual $f\theta$-lens 19. By designating the magnification of the cylindrical lens 17 and the $f\theta$-lens 19 in the vertical scanning direction as $M_1$ and $M_2$, respectively, the vertical size D of the beam spot on the recording surface 20 is given as $$D = M_1 \cdot M_2 \Delta f \pi / 2Na. \quad (8)$$

Figure 3C:
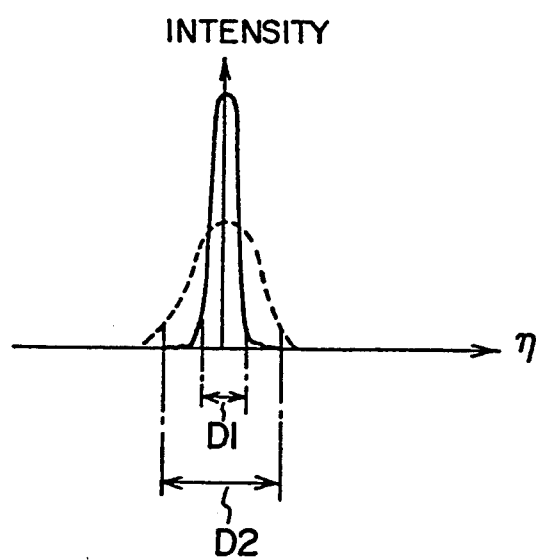

As can be seen from Eq. (8), the size D of the optical beam in the vertical scanning direction changes inversely proportional to the number N of the apertures 1A. When the number of apertures 1A that passes the optical beam is increased, the size of the beam spot decreases to $D_1$ as shown in FIG. 3(C), while when the number of the apertures 1A is decreased, the beam size increases to $D_2$ as shown in FIG. 3(C).

Figure 4A:
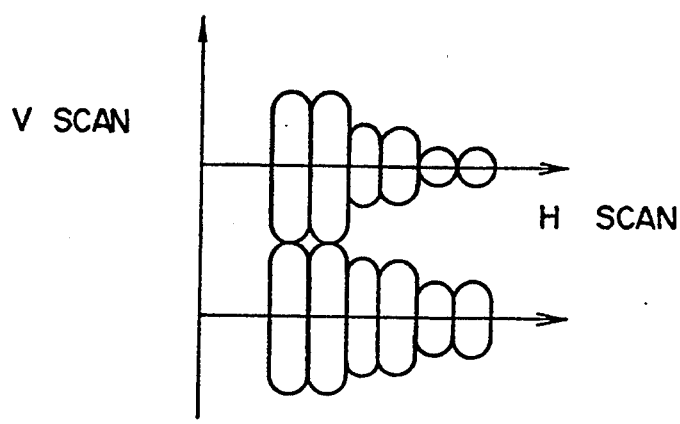
FIGS. 4(A) and 4(B) are diagrams showing the change of the actual beam size that is obtained by the variable aperture device of FIGS. 2(A)–2(D)
Figure 4B:
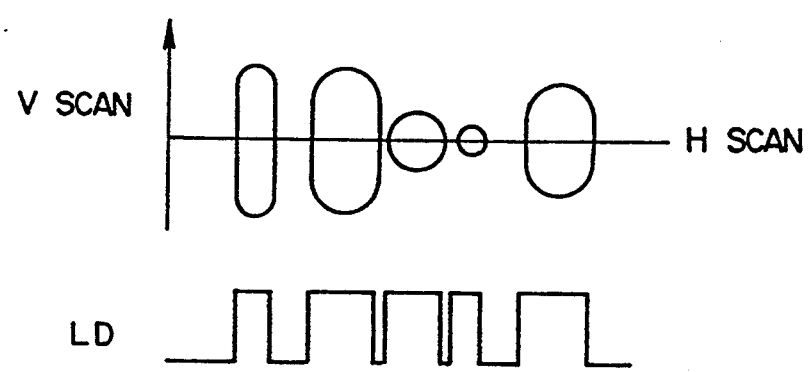

FIG. 4(A) shows an example of the actual change of beam spot on the recording surface 20 caused by controlling the number of apertures 1A that pass the optical beam. Referring to FIG. 4(A), the vertical beam size is changed while scanning the optical beam in the horizontal scanning direction. Further, one may change the beam size in both scanning directions by changing the width of the drive pulse LD supplied to the laser diode 10 for activating the same in synchronization to the change of the beam size in the vertical scanning direction as shown in FIG. 4(B). As a result of the change of the beam size achieved as described above, it is possible to achieve the graded recording of half-tone images such as photographs on the recording surface 20. By combining the usual technique of changing the driving power of the laser diode 20, a multi-level graded recording can be achieved without difficulty.

In the recording media that show a threshold characteristic wherein no recording is made at all when the optical power is smaller than a predetermined threshold level, there can occur a case where the change of the optical beam size is not achieved even when the number of the apertures that pass the optical beam is changed. In such a case, the power of the laser diode 10 may be changed inversely proportional to the number of the opened apertures N such that the optical power is increased when the number N of the opened apertures 1A is decreased and such that the optical power is decreased when the number N of the opened apertures 1A is increased.

Next, a second embodiment of the optical recording system of the present invention will be described with reference to FIGS. 5(A) and 5(B).

Figure 5A:
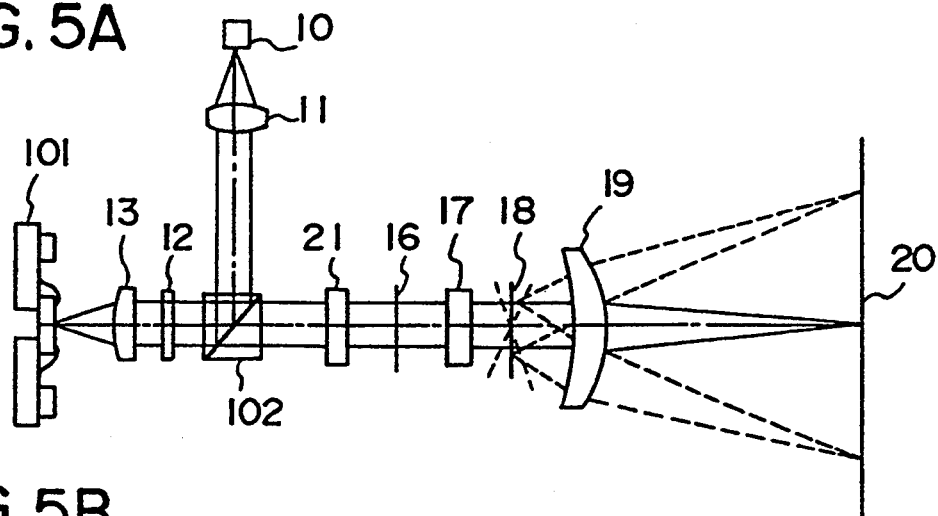
FIGS. 5(A) and 5(B) are diagrams showing the optical recording system according to a second embodiment and an embodiment of the variable aperture device that is used in the optical recording system.

Referring to FIG. 5(A) showing the plan view of the optical recording system of the second embodiment, the divergent optical beam produced by the optical source 10 is converted to a parallel optical beam by the lens 11 and deflected to the left by a polarizing beam splitter 102. After passing through the beam splitter 102, the plane of polarization of the optical beam is rotated upon passage through the half-lambda plate 12 and focused by the cylindrical lens 13 to form a flat optical beam having an elongated beam shape that extends perpendicular to the plane of FIG. 5(A) at the position wherein a variable aperture device 101 is provided.

Figure 5B:
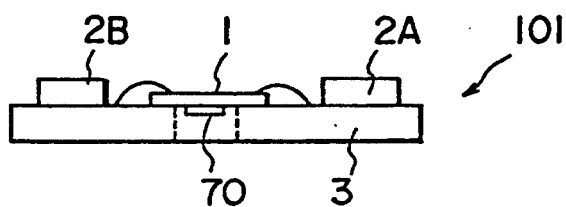

FIG. 5(B) shows the construction of the variable aperture device 101 used in the system of FIG. 5(A). As shown in FIG. 5(B), the device 101 has a construction substantially identical with the device 100 except that there is provided a metal layer 70 acting as a mirror at the lower major surface of the PLZT layer 1. The mirror 70 reflects the optical beam that has passed through the activated apertures 1A. In the present device 101, too, the foregoing description of the principle of the activation of the apertures holds, except that the phase difference $\Gamma$ is given as $$\Gamma = (\pi/\lambda) \cdot 2t \cdot n_o^3 \cdot R_c \cdot E^2$$

in correspondence to the optical path that is twice as large as the case of the device 100.

The optical beam that is reflected by the device 101 passes the lens 13 and the plate 12 in the reversed direction and passes through the beam splitter 102. Thereby, the half-lambda plate 12 and the polarizing beam splitter 102 act as the polarizer 4 and the analyzer 5 of the first embodiment.

The optical beam that has passed through the beam splitter 102 then enters to a cylindrical lens that focuses the optical beam within the plane that extends perpendicular to the plane of FIG. 5(A), and an elongated beam shape extending in the horizontal scanning direction is obtained at the position where the slit 16 is provided. The slit 16 eliminates the diffraction beam higher than the first order similarly to the first embodiment, and the optical beam obtained by the slit 16 is focused on the recording surface 20 by the cylindrical lens 17 and the f$\theta$-lens 19. The deflection of the beam is achieved in the horizontal scanning direction by the rotary polygonal mirror 18 as usual.

Figure 6A:
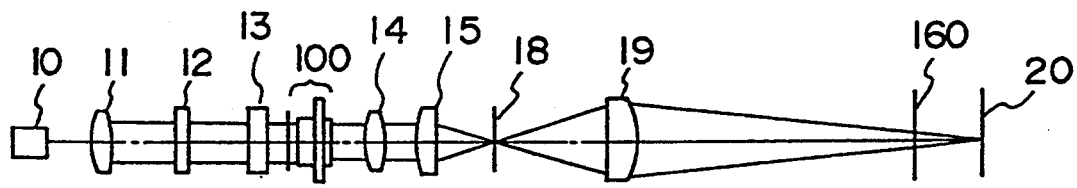
FIGS. 6(A) and 6(B) are diagrams showing a third embodiment of the optical recording system according to the present invention.
Figure 6B:
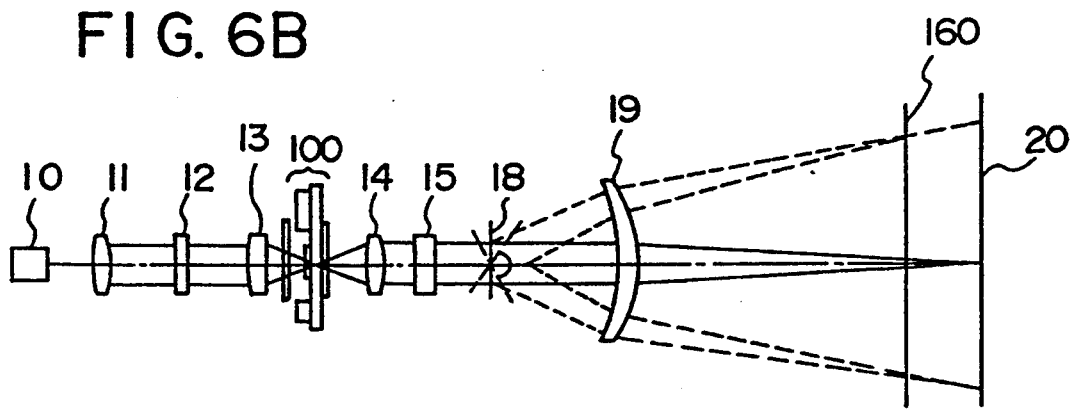

FIGS. 6(A) and 6(B) show a third embodiment of the optical recording system according to the present invention, wherein FIG. 6(A) shows the side view and FIG. 6(B) shows the plan view. As the construction of system is substantially identical with the first embodiment, only the difference that distinguishes the third embodiment from the first embodiment will be described.

In the third embodiment, it should be noted that the slit 16 and the lens 17 are eliminated and the lenses 14, 15 and 19 are used to focus the optical beam on the recording surface 20. Further, in order to eliminate the unwanted diffraction of the optical beam, a slit 160 is provided close to the recording surface 20 at a position between the f$\theta$-lens 19 and the recording surface 20. It should be noted that the slit 160 has an elongated opening that extends in the horizontal scanning direction in coincidence with the plane in which the optical beam is deflected by the rotary polygonal mirror 18. In this construction, too, one can effectively eliminate the exposure of the recording surface 20 to the diffraction beam that is formed at the variable aperture device 100.

Figure 8A:
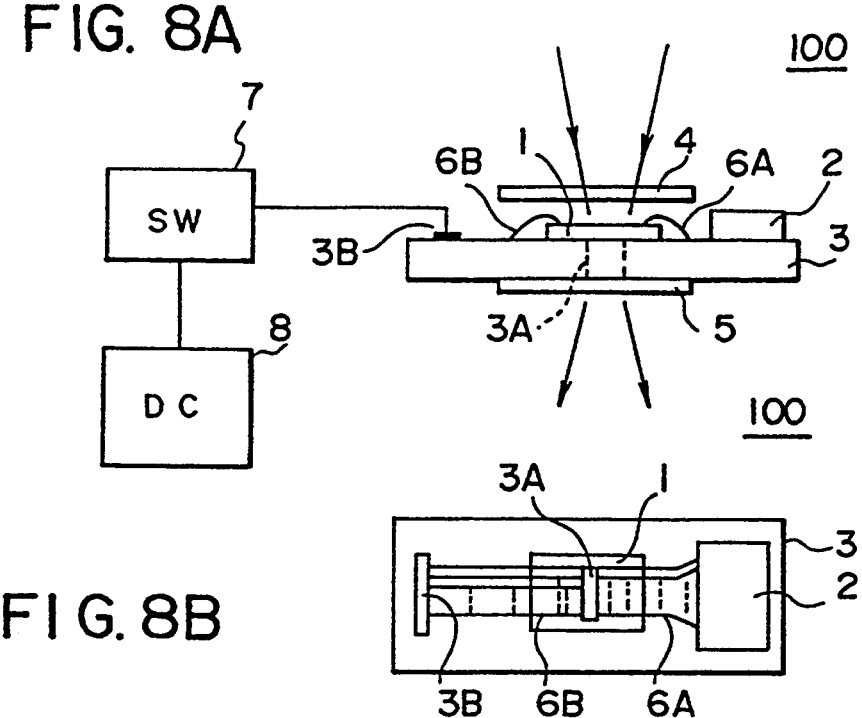
FIGS. 8(A)–8(C) are diagrams showing another embodiment of the variable aperture device and the inversion of d.c. biasing used therein.
Figure 8B:
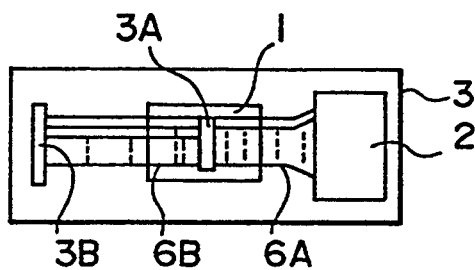

FIGS. 8(A) and 8(B) show another embodiment of the variable aperture device that can be used in any of the foregoing optical recording systems.

The variable aperture device of the present embodiment is developed to eliminate the problem of degradation of performance that appears in the variable aperture device 100 of FIGS. 2(A) and 2(B). More particularly, the variable aperture device 100 tends to interrupt the passage of the optical beam through the apertures 1A even when a drive voltage is applied across the electrodes 2A and 2B, particularly when the device is used continuously for a long time.

It is believed that this undesirable degradation of the optical on/off function of the apertures 1A is caused by the formation of the space charges in the PLZT layer 1 caused as a result of continuous application of the drive voltage across the electrodes 2A and 2B. Such space charges are believed to be formed as a result of the trapping of the photocarriers that are migrated in the PLZT layer 1 by the electric field caused by the drive voltage. When the space charges are formed, the electric field that is produced by the space charges tends to cancel out the electric field by the drive voltage and the electro-optic Kerr effect no longer occurs satisfactorily.

Figure 7:
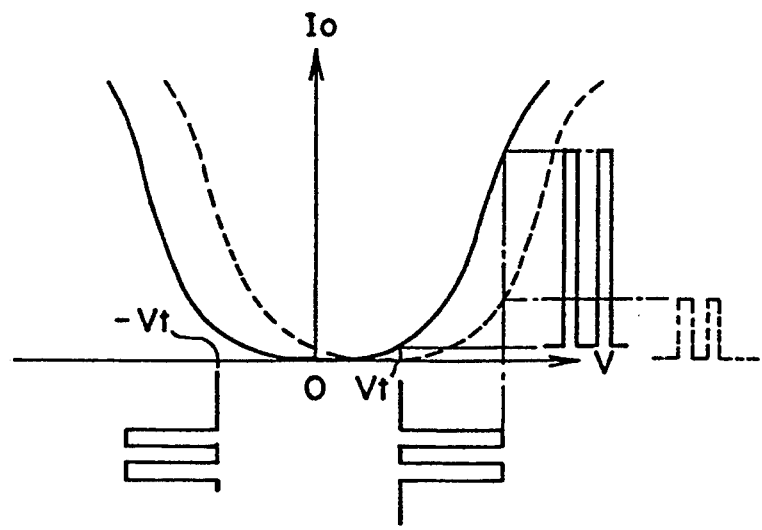
FIG. 7 is a diagram showing the effect achieved by the inversion of the d.c. biasing.

FIG. 7 shows the foregoing phenomenon in the form of optical transmittance characteristics.

Referring to FIG. 7, the diagram shows the relationship between the intensity $I_o$ of the optical beam that has passed through an aperture 1A of the variable aperture device 100 and the drive voltage V that is applied across the electrodes 2A and 2B provided at both sides of the aperture 1A. As shown in FIG. 7 by the continuous line, the optical intensity $I_o$ increases generally symmetrically with increasing magnitude of the drive voltage V.

Thus by applying a positive bias voltage $+V_b$ or a negative bias voltage $-V_b$ and superposing positive or negative drive pulses thereon, one can control the passage of the optical beam through the aperture 1A as a result of the electro-optic Kerr effect that is induced in the aperture 1A. For example, one can control the aperture 1A to allow the passage of the optical beam by superposing a positive drive pulse to the positive bias voltage $+V_b$. Alternatively, one may superpose a negative drive pulse to the negative bias voltage $-V_b$.

In the foregoing operation of the variable aperture device 100, it is observed that the characteristic curve of transmittance shifts laterally in the drawing as shown by the broken line, when the bias voltage of $+V_b$ is applied continuously across the electrodes 2A and 2B. Thereby, it will be understood that the intensity $I_o$ of the output optical beam is substantially reduced even when the drive pulse is applied, as shown by the output pulses represented by the broken line in FIG. 7. In other words, the activation of the apertures 1A of the variable aperture device 100 to pass the optical beam therethrough tends to become incomplete and the desired change of the beam size of the optical beam cannot be attained.

In view of the evidence that the magnitude of shift of the characteristic curve increases with increasing intensity of the incident optical beam, it is believed that the foregoing effect is induced by the photocarriers that are created in response to the irradiation of the incident optical beam and trapped in the PLZT layer 1 to form the space charges. As already noted, such space charges tend to form the electric field that cancels out the electric field that is formed by the drive voltage V.

FIGS. 8(A) and 8(B) show the variable aperture device 100 of another embodiment for eliminating the foregoing problem.

Referring to the drawings, the variable aperture device includes an RF drive circuit 2 on the ceramic substrate 3 in place of the circuit 2A, and the drive circuit 2B is removed. Instead, there is provided a bonding pad 3B on the substrate 3 and d.c. voltage source 8 supplies a d.c. bias voltage to the bonding pad 3B via a switch circuit 7. The switch circuit 7 supplies the d.c. drive voltage to the bonding pad 3B with controlled polarities, and the bonding pad 3B supplies the drive voltage to each of the electrodes 1E simultaneously by respective bonding wires 6B. See the equivalent circuit diagram of FIG. 8(C).

In the foregoing construction, one can change the polarity of the d.c. bias voltage periodically by the switch circuit 7. The polarity is changed with a period of several seconds or less, more preferably less than several seconds, and most preferably less than 3 seconds. For example, the polarity change may be achieved for every several horizontal scanning lines or every one page of optical recording. By switching the polarity of the d.c. bias voltage, one can eliminate the formation of space charges in the PLZT layer 1 and the variable aperture device shows a stable operation even after a continuous use.

Figure 9A:
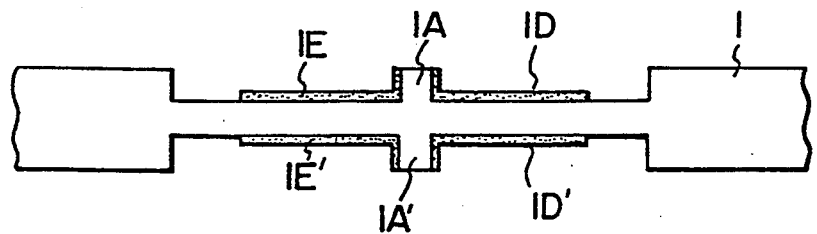
FIGS. 9(A) and 9(B) are diagrams showing the details of the apertures provided in the variable aperture device used in the optical recording system of the present invention.
Figure 9B:
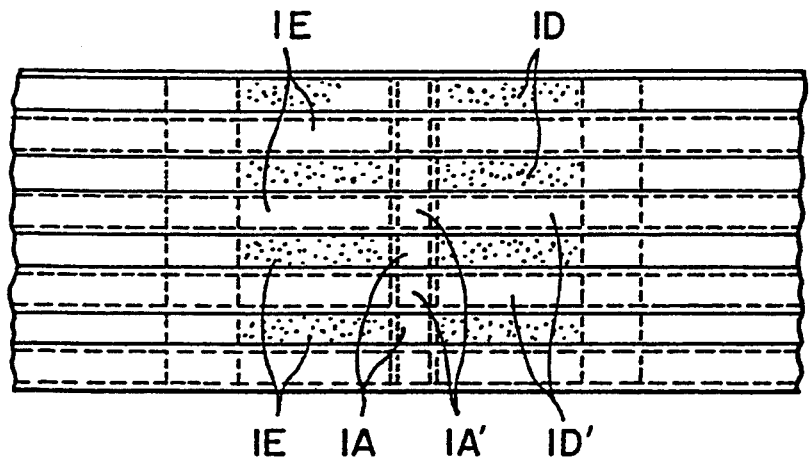

FIGS. 9(A) and 9(B) show another embodiment of the variable aperture device 100.

In this embodiment, the groove for holding the electrodes is provided at both upper and lower major surfaces of the PLZT layer 1. Thus, there are provided electrodes 1E' and 1D' at the lower major surface of the PLZT plate 1 with a projecting aperture region 1A' formed therebetween in alignment with the projecting aperture region 1A when viewed in the side view of FIG. 9(A). In the plan view of FIG. 9(B), on the other hand, it will be noted that the aperture 1A and the aperture 1A' are arranged alternately in the vertical direction of FIG. 9(B). Thus, the aperture 1A' is formed to project in the downward direction in correspondence to a space or gap formed between a pair of adjacent apertures 1A that project in the upward direction.

Further, in correspondence to the aperture 1A', the electrodes 1D' and 1E' are provided such that the electrode 1D' is provided at the lower side of the plate 1 in correspondence to a space or gap formed between a pair of adjacent electrodes 1D and such that the electrode 1E' is provided also at the lower side of the plate 1 in correspondence to a space or gap formed between a pair of adjacent electrodes 1E. Thereby, the electrodes 1D and 1D' are arranged alternately in the vertical direction of FIG. 9(B) at the right side of the array of the apertures 1A and 1A', and the electrodes 1E and 1E' are arranged alternately also in the vertical direction of FIG. 9(B) at the left side of the array of the apertures 1A and 1A'.

In the construction of the present embodiment, the electrodes 1D and 1D' or the electrodes 1E and 1E' are provided at different sides of the PLZT layer 1. Thereby, one can reduce the distance between adjacent electrodes on each side of the PLZT layer 1 and the apertures 1A and 1A' are formed on the PLZT layer 1 with a correspondingly reduced mutual separation.

Figure 10A:
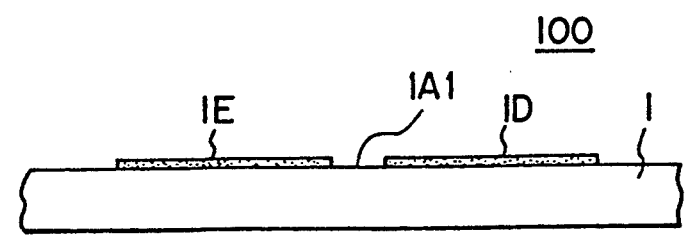
FIGS. 10(A) and 10(B) are diagrams showing another example of the apertures provided in the variable aperture device.
Figure 10B:
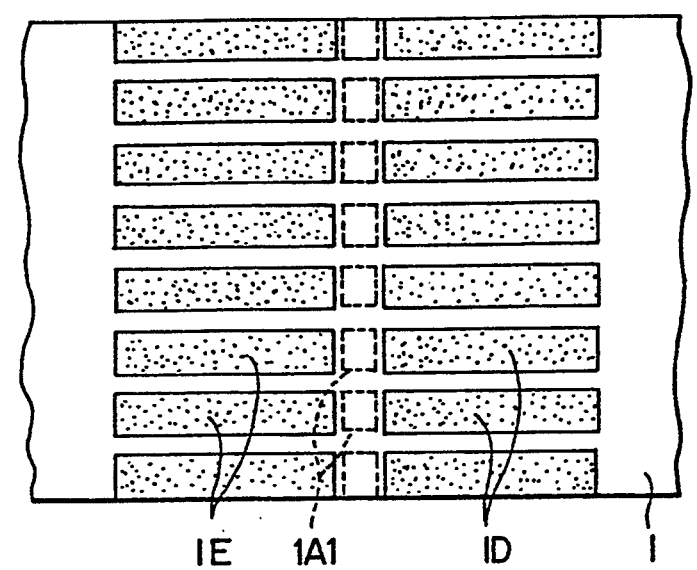

FIGS. 10(A) and 10(B) show another embodiment of the variable aperture device 100, wherein the electrodes 1D and 1E are provided on the substantially flat upper major surface of the PLZT layer 1. In other words, the groove is not provided in the present embodiment. In correspondence to the gap between the adjacent electrodes 1D and 1E, an aperture $1A_1$ is formed as illustrated. As can be seen in FIG. 10(A), there is no projection in correspondence to the aperture $1A_1$ in the present embodiment.

Figure 11A:
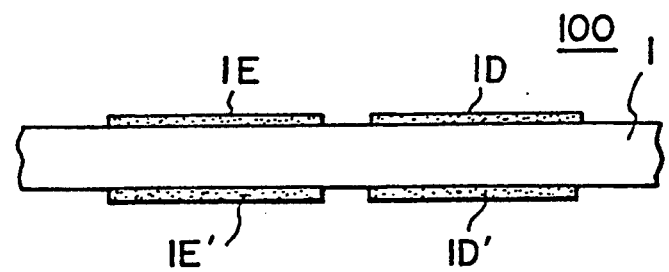
FIGS. 11(A) and 11(B) are diagrams showing still another example of the apertures provided in the variable aperture device.
Figure 11B:
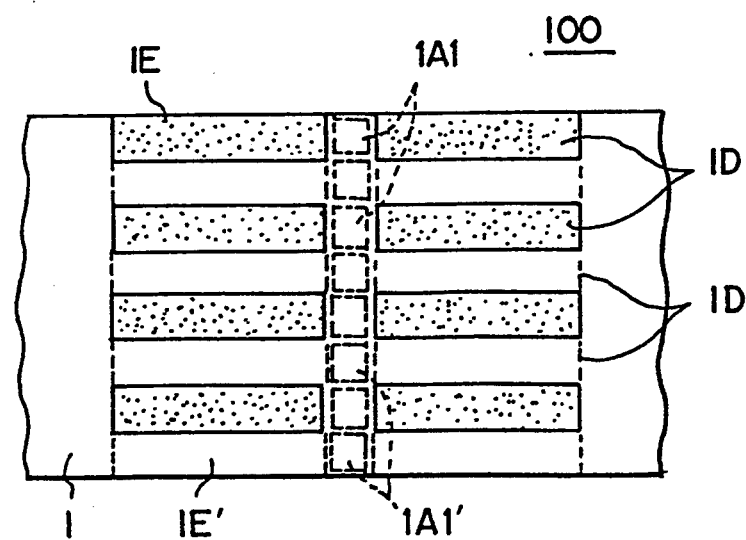

FIGS. 11(A) and 11(B) show a still other embodiment of the variable aperture device 100, wherein the electrodes 1D and 1D' and the electrodes 1E and 1E' are provided alternately on the upper and lower major surfaces of the PLZT layer 1. Similar to the embodiment of FIGS. 9(A) and 9(B), an aperture $1A_1'$ is formed between the pair of electrodes 1D' and 1E', and the apertures $1A_1$ and $1A_1'$ are aligned alternately in the vertical direction in the plan view of FIG. 11(B). In this embodiment, too, one can reduce the separation between the electrodes and hence the separation between the apertures.

It should be noted that any of the variable aperture devices 100 that have been explained so far can be used for the optical recording system of the present invention. Further, by providing a mirror at one side of the aperture, one can use the variable aperture device 100 for the optical recording system described with reference to FIGS. 5(A) and 5(B).

Figure 8C:
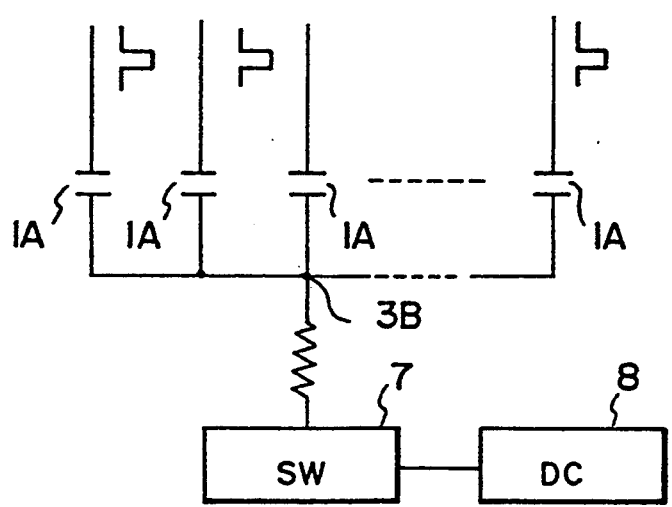

In the embodiment of FIGS. 8(A)-8(C), it will be noted that one can modify the device 100 to remove the RF driver unit 2 such that the variable apertures are driven directly by the RF pulses given externally.

In the embodiments described so far, the variable aperture device lacks the means for controlling the temperature of the electro-optic layer. On the other hand, there arise cases wherein the control of temperature of the device is preferable as will be understood from the embodiments described below.

Figure 12:
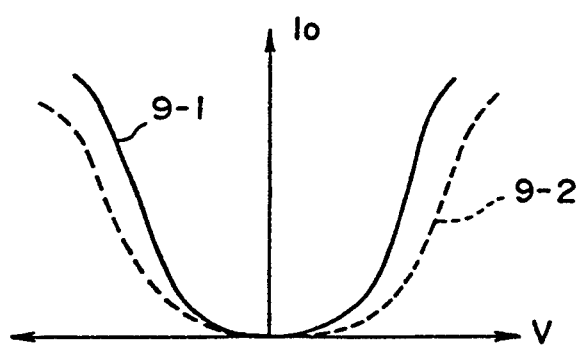
FIG. 12 is a diagram showing the change of the characteristic of the electro-optic element used for the variable aperture device with the increase of temperature.

FIG. 12 shows the characteristic curve of the electro-optic layer 1 for two different temperatures, wherein the continuous line represents the characteristics at a first, lower temperature, while the broken line represents the characteristics at a second, higher temperature. As will be obvious from FIG. 12, the intensity $I_0$ of the optical beam transmitted through the aperture is decreased with increasing temperature, even when the aperture is in the opened state for transmitting the optical beam.

Figure 13A:
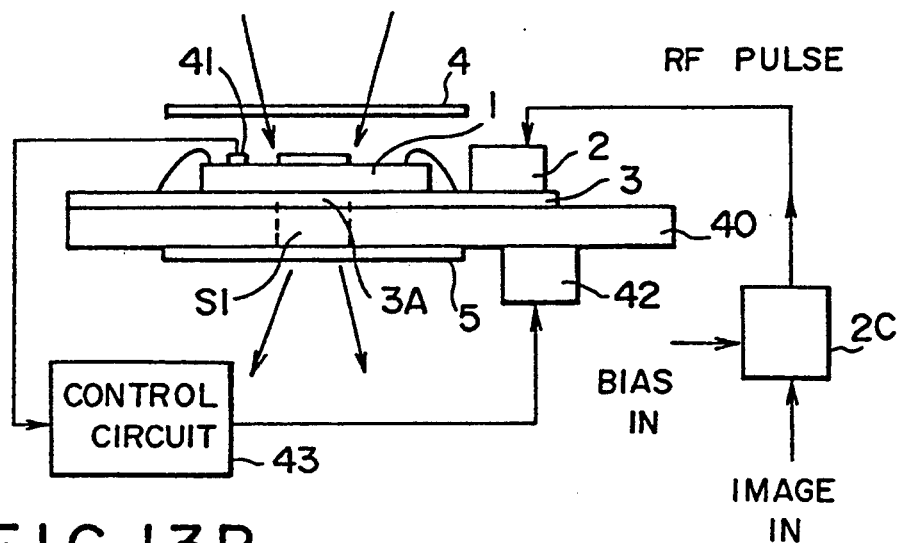
FIGS. 13(A) and 13(B) are diagrams showing the construction of the variable aperture device according to other embodiments of the present invention.

FIG. 13(A) shows an embodiment of the variable aperture device that has a temperature control system.

Referring to FIG. 13(A), a device having a construction substantially identical with the device of FIG. 8(A) is provided on a copper plate 40. More specifically, the ceramic substrate 3 of the device of FIG. 8(A) is provided on an upper major surface of the copper plate 40, and there is provided a slit $S_1$ in the copper plate 40 in alignment with the slit 3A formed in the ceramic substrate 3. Further, the analyzer 5 is provided on a lower major surface of the copper plate 40.

On the PLZT layer 1, there is provided a temperature sensor 41 for detecting the temperature of the layer 1, and a temperature control device 42 such as a heater is provided on the copper plate 40 such that the temperature control device 42 is driven by a controller 43 in response to the temperature detected at the temperature sensor 41.

Figure 13B:
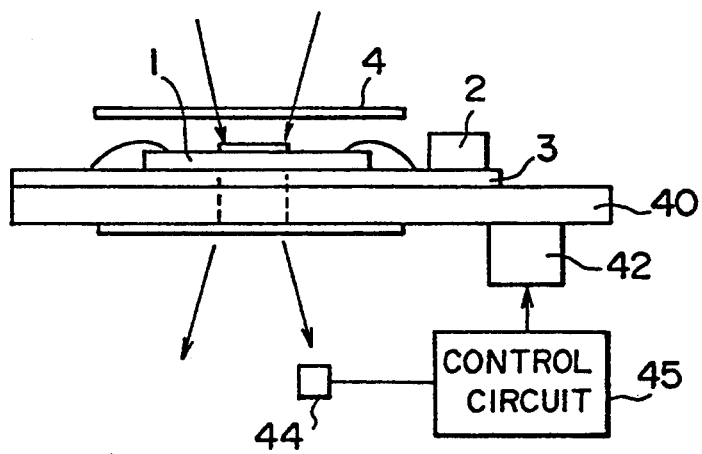

FIG. 13(B) shows a modification of the device of FIG. 13(A) in which the detection of the temperature is achieved by detecting the intensity of the optical beam passed through the device. As described with reference to FIG. 12, there exists a relationship between the temperature and the intensity of the optical beam that has passed through the aperture. Thus, the present embodiment employs an optical sensor 44 for the detection of the intensity of the optical beam, and the temperature of the PLZT layer 1 is inferred based upon the intensity of the optical beam thus detected. The optical sensor 44 may be provided to detect the optical beam by deflecting the optical beam by a semi-transparent mirror provided at the lower side of the copper plate 40 or may be provided close to but offset from a range of scanning by the deflected optical beam. The output of the optical sensor 44 is supplied to a control unit 45 for amplification, and the control unit 45 drives the temperature control device 42.

Typically, the PLZT layer 1 is set at a temperature higher than the temperature of the environment. For example, the temperature of the PLZT layer 1 may be set at 50° C. When the temperature of the layer 1 decreases below 50° C., a device such as a heater that forms the temperature control device 42 is activated such that the temperature is maintained at 50° C. Alternatively, one may use a Peltier device for the device 42 when it is desired to maintain the temperature of the PLZT layer 1 at a room temperature such as 20° C.

In the embodiments of FIGS. 13(A) ad 13(B), it should be noted that these devices use also the d.c. voltage source 8 and the switch circuit 7 similarly to the previous embodiments, although the illustration of these parts are omitted for avoiding complexity. Further, it should be noted that there is provided a signal processor 2C in cooperation with the RF driver unit 2 such that the processor 2C is supplied with the image signal as well as the d.c. bias signal from the switch circuit 7 for producing the RF signal as will be described in detailed later. Further, it should be noted that one may cover the upper major surface of the copper layer 40 by an insulating film. In this case, the ceramic substrate 3 may be eliminated and one can provide the PLZT layer 1 and the RF driver 2 directly on the insulating film. Further, it should be noted that one may eliminate the RF driver 2 when the RF signal is supplied directly from an external device.

FIGS. 14(A) and 14(B) are diagrams similar to FIGS. 6(A) and 6(B) showing the optical recoding system wherein the variable aperture device of FIGS. 13(A) and 13(B) are used. In these drawings, those parts and elements that are described previously are designated by the same reference numerals and the description thereof are eliminated.

Referring to the drawings, the system of the present embodiment employs a variable aperture device 1000 that corresponds to the device of FIG. 13(A) or FIG. 13(B) and includes a temperature regulation control as described previously. Further, the d.c. voltage source 8 and the switch circuit 7 cooperates with the device such that the polarity of the d.c. bias is changed with a predetermined interval such that the optical drift is eliminated. As described previously with reference to other embodiments, such an inversion of the polarity may be achieved in each line or in each page.

Further, there are provided slit members 200 and 300 respectively between the lenses 14 and 15 and between the lens 17 and the object 18 for eliminating the higher order diffraction caused by the variable aperture device 1000. There, the slit member 200 has an elongate opening extending in the direction perpendicular to the horizontal scanning direction for eliminating the diffraction components appearing along the horizontal scanning line, while the slit member 300 has an elongate opening extending in the direction of the horizontal scanning direction for eliminating the diffraction components appearing along the vertical scanning line.

Next, the control process applicable to the optical recording system of FIGS. 14(A) and 14(B) for controlling the beam size of the optical beam will be described with reference to FIGS. 15(A)–15(F). It should be noted that these drawings show the control of passage of the optical beam occurring at a single aperture that forms an aperture array in the variable aperture device 1000 together with other apertures. In the present embodiment, the inversion of polarity of the d.c. bias is achieved in each one line of the image signal.

Figure 15A:
FIGS. 15(A)–15(F) are diagrams showing the timing chart for driving the optical recording system with the variable aperture device according to another embodiment of the present invention.
Figure 15B:
Figure 15C:
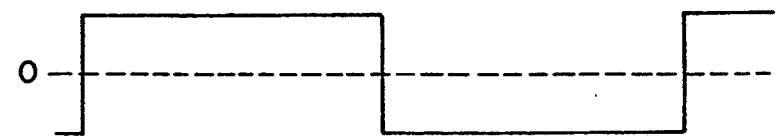

Referring to the drawings, FIG. 15(A) shows a line synchronizing signal for providing the timing of the horizontal scanning line, while FIG. 15(B) shows a gradation signal provided externally for indicating the gradation of the image signal to be recorded. This gradation signal is given as a part of the image signal for representing the gradation of the image to be exposed. One may regard the gradation signal as the image signal representing the image to be exposed by the optical beam that passes through the single aperture in consideration. At the level 0, the gradation signal indicates the closure of the aperture for interrupting the optical beam. In response to this, the exposure level on the photosensitive body is reduced. When the gradation signal is high, on the other hand, the optical beam passed through the aperture in consideration is added to the optical beam used for recording, and the exposure level of the image is increased. Further, FIG. 15(C) shows the bias voltage that is applied commonly to all the apertures in the device 1000. As noted above, the polarity of the bias voltage is changed in each line.

Figure 15D:
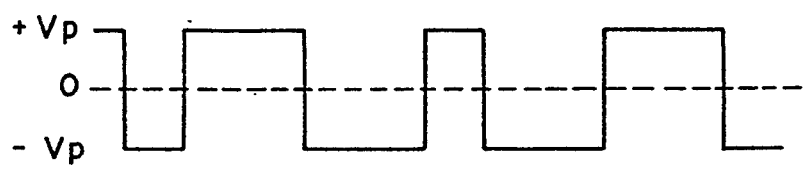
Figure 15E:
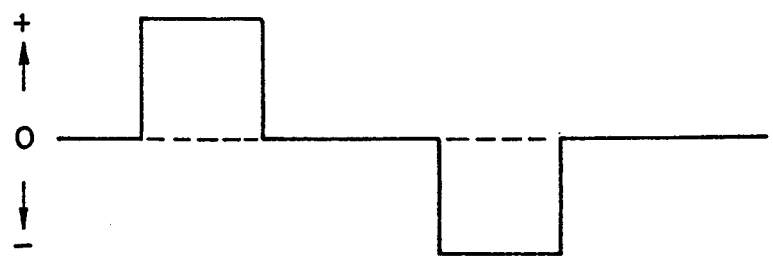
Figure 15F:

FIG. 15(D) shows the RF pulse for activating the aperture under consideration. As noted previously, the RF pulse is produced in the processor 2C (FIG. 13(A)) based upon the d.c. bias voltage of FIG. 15(C) and the gradation signal of FIG. 15(B). In the present embodiment, the RF pulse has a variable pulse width that may be changed in each aperture of the variable aperture device. The RF pulse changes between a level $+V_p$ and a level $-V_p$ in response to the level of the gradation signal of FIG. 15(B) as well as in response to the bias voltage of FIG. 15(C), and a drive signal as shown in FIG. 15(E) is formed from the RF pulse of FIG. 15(D) by superposing the RF pulse to the bias voltage. It should be noted that the polarity of the RF pulse is set coincident to the polarity of the bias voltage in correspondence to the interval where the optical beam is to be passed, while the polarity is inverted in the interval where the optical beam is to be interrupted. Thereby, one obtains an output optical pulse as shown in FIG. 15(F).

FIGS. 16(A)–16(F) show the time chart for controlling the size of the optical beam according to another embodiment of the present invention. Again, these drawings show the control of only one, single aperture that forms the array of apertures in the variable aperture device.

Figure 16A:
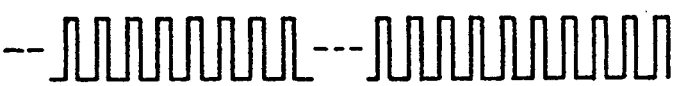
FIGS. 16(A)–16(F) are diagrams showing the timing chart for driving the optical recording system with the variable aperture device according to another embodiment of the present invention.
Figure 16B:
Figure 16C:

Referring to the drawings, FIG. 16(A) shows the timing of an exposure clock pulse that specifies the timing for writing each picture element by the optical beam, while FIG. 16(B) shows the gradation signal corresponding to the signal of FIG. 15(B).

Figure 16D:
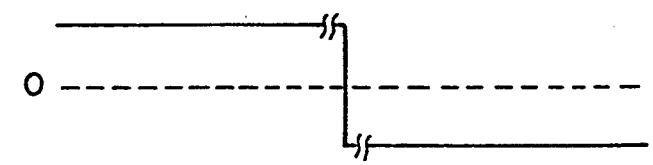
Figure 16E:
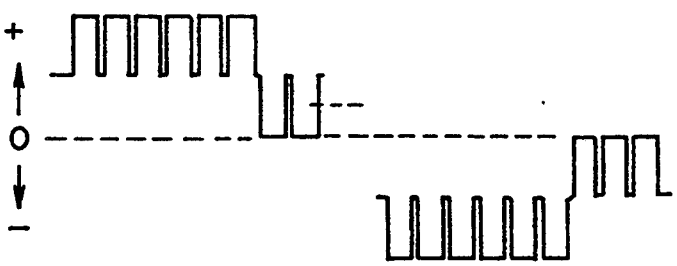
Figure 16F:
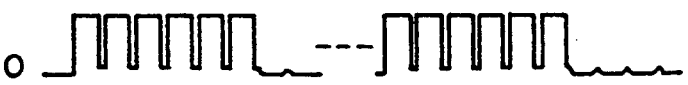

In the present embodiment, the RF pulse for controlling the transparency of the aperture is provided in synchronization with the clock pulse of FIG. 16(A), wherein the polarity of the RF pulse is changed, with respect to the bias voltage given in FIG. 16(D), in response to the gradation signal of FIG. 16(B). More specifically, the RF pulse has a polarity the same as the polarity of the bias voltage when there is a high level gradation signal indicating the exposure through the aperture in consideration. On the other hand, the RF pulse has an opposite polarity when the level of the gradation signal is zero. Thereby, one obtains a drive signal that is actually applied across the aperture as indicated by FIG. 16(E). In response to the drive signal of FIG. 16(E), one obtains an optical output at the aperture as indicated in FIG. 16(F).

In the present embodiment, it should be noted that the RF pulse is produced continuously in response to the exposure clock, irrespective of whether the aperture is activated for transmitting the optical beam or not. Thereby, the generation of heat associated with the RF pulse becomes uniform for all the apertures in the variable aperture device, and a uniform temperature distribution is achieved. It should be noted that the heat generated in such a dielectric device is generally proportional to the square of the applied voltage and the frequency. As there are apertures that are activated frequently and also there are apertures that are activated seldom, there can occur a problem of non-uniform distribution of heat in the device when the RF pulse is applied only to the apertures that are activated. Such a non-uniform temperature distribution within the device is difficult to compensate for even when the temperature regulation system described previously is employed. In the present embodiment, the problem of non-uniform heat generation and hence the non-uniform temperature distribution is successfully eliminated.

Next, another embodiment for controlling the size of the optical beam in the optical recording system of FIGS. 14(A) and 14(B) will be described with reference to FIGS. 17(A)–17(G), wherein FIG. 17(A) shows an exposure clock pulse corresponding to the clock pulse of FIG. 16(A), FIG. 17(B) shows the line synchronizing signal corresponding to the synchronizing signal of FIG. 15(A), FIG. 17(C) shows the bias voltage described previously, and FIG. 17(D) shows the gradation signal also described previously. It will be noted that the polarity of the bias voltage is changed in response to the line synchronizing signal.

FIG. 17(E) shows the RF pulse that is used in the present embodiment for activating the aperture, wherein it will be noted that the RF pulse is formed from two parts, the first part corresponding to the gradation signal with the same timing and the pulse width as the gradation signal, and the second part corresponding to the interval where the gradation signal is absent. Generally, the gradation signal has a pulse width much larger than the clock pulse of exposure. In the second part, on the other hand, the RF pulse has the pulse width and timing the same as the exposure clock pulse. Thereby, one obtains a drive pulse that is actually applied to the aperture as shown in FIG. 17(F), and an optical output as shown in FIG. 17(G) is obtained in response to the drive signal of FIG. 17(F). There, it should be noted that the optical output appears continuously during the interval of the gradation signal.

Next, still another embodiment of the present invention for controlling the size of the optical beam in the optical recording system of FIGS. 14(A) and 14(B) will be described with reference to FIGS. 18(A)–18(G).

In the previous three embodiments for the exposure process, there can occur a case wherein the duration of the gradation signal may be different in the first horizontal scanning interval and in the second horizontal scanning interval that follows the first scanning interval. In such a case, the duration in which the drive pulse for example shown in FIG. 16(E) may be different in the positive drive pulse for the first interval and in the negative drive pulse for the second interval. When such a deviation in the polarity continues, there can occur a case that the PLZT layer 1 forming the variable aperture device may be charged up and the problem of the "optical drift" may occur in spite of the inversion of the polarity of the d.c. bias voltage. The present embodiment intends to eliminate the problem of charge up of the electro-optic layer.

Figure 18A:
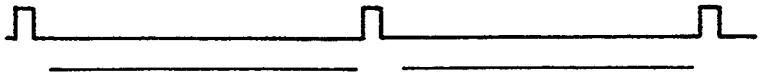
Figure 18B:
Figure 18C:

Referring to the drawings, FIG. 18(A) shows the exposure clock pulse corresponding to FIG. 17(A), FIG. 18(B) shows the line synchronizing signal corresponding to FIG. 17(B), FIG. 18(C) shows the bias voltage, and FIG. 18(D) shows the gradation signal. There, it will be noted that one horizontal scanning interval, defined in FIG. 18(B) as the region extending between a pair of line synchronizing signals, includes a scanning interval for exposing the image by the optical beam and a blanking interval for returning the scanning system to the initial state without causing exposure. In other words, the laser diode for producing the optical beam is deactivated in the blanking interval.

Figure 18E:

There, the RF pulse is produced in synchronization with the exposure clock pulse of FIG. 18(A) as shown in FIG. 18(E), in correspondence to the gradation signal of FIG. 18(D) and with the polarity coincident to the polarity of the bias voltage of FIG. 18(C) as explained previously, except that the number of the RF pulses that appear in correspondence to the interval in which the gradation signal is in the non-zero state is counted in each horizontal scanning interval. In the illustrated example of FIG. 18(E), there are five RF pulses in the first interval in correspondence to the gradation signal of FIG. 18(E), while in the next, second interval, the number of the RF pulse corresponding to the non-zero state of the gradation signal is only two. When the optical exposure is achieved according to the RF pulses thus obtained, there occurs a problem of the positive charge-up of the PLZT layer because of the unbalanced positive and negative RF pulses and hence the drive pulses.

Figure 18F:
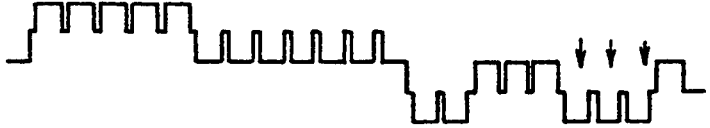
Figure 18G:

In order to eliminate this problem, the process of the present embodiment adds the RF pulses in the second interval in correspondence to the blanking interval such that the total number of the RF pulses becomes the same in the first horizontal scanning line and in the second horizontal scanning line. In the illustrated example, three RF pulses marked by arrows are added. Thereby, one obtains a drive pulse as shown in FIG. 18(F) and the optical exposure is achieved as shown in FIG. 18(G). There, it will be noted that the exposure does not occur in correspondence to the RF pulses that are added artificially as these extra RF pulses are formed in the blanking interval where the laser diode is deactivated. Thereby, one can eliminate the problem of "optical drift" even when a pattern as shown in FIG. 18(G) is exposed.

It should be noted that such a detection of the unbalanced exposure in the adjacent horizontal scanning intervals may be achieved by detecting the interval of the RF pulses that correspond to the gradation signal, instead of counting the number of the RF pulses. Further, one may compare the result of counting of the RF pulses with a reference number for activating the "compensation" in the blanking interval.

Other objects and further features of the present invention will become apparent from the following detailed description when read in conjunction with the attached drawings.

What is claimed is

1. An optical shutter device for controlling a passage of an optical beam, comprising:
   an electro-optic layer of a material that shows an electro-optic effect, said electro-optic layer having an upper major surface and a lower major surface and causing a rotation of the polarizing plane in response to an application of a voltage;
   an array of shutter regions defined on said electro-optic layer for controlling a passage of an optical beam through said electro-optic layer, each of said shutter regions controlling the passage of the optical beam by inducing the electro-optic effect therein in response to an application of an electric field that acts across said shutter regions in a predetermined direction;
   a plurality of electrodes provided on at least one of the upper major surface and the lower major surface of said electro-optic layer in correspondence to said array of shutter regions, said plurality of electrodes being arranged to form electrode pairs each defining a passage region therebetween, said electrode pairs being separated from each other and applying said electric field independently from each other upon energization;
   driver means connected to each of said electrode pairs for energizing each electrode pair independently from other electrode pairs;
   biasing means connected to the electrode pairs for applying a predetermined d.c. bias voltage thereto with a predetermined polarity;
   switching means for inverting the polarity of the d.c. bias voltage that is applied to the electrode pairs;
   first polarizing means provided above the upper major surface of the electro-optic layer for setting the polarizing plane of the optical beam passing therethrough at a first angular direction; and
   second polarizing means provided below the lower major surface of said electro-optic layer for setting the polarizing plane of the optical beam passing therethrough at a second, opposite angular direction.

2. An optical shutter device as claimed in claim 1, in which said switching means is connected in series to said biasing means, said switching means being connected to each of said electrodes for supplying said d.c. bias voltage simultaneously to each of said electrodes.

3. An optical shutter device as claimed in claim 1, in which each electrode pair includes a first electrode and a second electrode aligned in a first direction, each of said shutter regions being respectively formed between a said first electrode and a said second electrode, said shutter regions being aligned in a second direction that is different from said first direction.

4. An optical shutter device as claimed in claim 3, in which said upper major surface is provided with a groove having a bottom surface, said electrodes forming the electrode pairs being provided on said bottom surface of the groove such that each of said shutter regions projects in the upward direction from the bottom surface of the groove.

5. An optical shutter device as claimed in claim 3, in which said plurality of electrodes are provided on said upper major surface and said lower major surface of the electro-optic layer such that each said electrode pair on the upper major surface and each said electrode pair on the lower major surface are repeated alternately in said second direction when viewed in a direction perpendicular to the upper major surface and the lower major surface of the electro-optic layer.

6. An optical shutter device as claimed in claim 5, in which said electro-optic layer is formed with first and second grooves each having a bottom surface, respectively on the upper major surface and the lower major surface of said electro-optic layer, each said first electrode and each said second electrode forming each respective electrode pair being respectively provided on said bottom surface of each of said first and second grooves such that each said electrode pair on the bottom surface of the first groove and each said electrode pair on the bottom surface of the second groove are repeated alternately in the second direction when viewed in a direction perpendicular to said upper major surface and said lower major surface of the electro-optic layer, said first groove defining said shutter regions as projections projecting in the upward direction from said bottom surface of said first groove, said second groove defining said shutter regions as projections projecting in the downward direction from said bottom surface of said second groove, said shutter regions projecting in the upward direction and said shutter regions projecting in the downward direction being aligned and repeated alternately in said second direction when viewed in a direction substantially perpendicular to said upper major surface and said lower major surface of said electro-optic layer.

7. An optical recording system for recording an image on a recording medium by means of an optical beam that is deflected repeatedly in a horizontal scanning direction with a variable beam size, comprising:
an optical beam source for producing an optical beam;
first polarizing means provided in a path of said optical beam for rotating a polarizing plane of said optical beam in a first angular direction;
shutter array means provided for receiving said optical beam from said first polarizing means, said shutter array means comprising:
an electro-optic layer that shows the electro-optic effect on an optical beam that passes therethrough;
a plurality of electrodes provided on said electro-optic layer, said electrodes being arranged to form electrode pairs each defining a shutter region therebetween for passing the optical beam that is incident to said shutter array means, each of said electrodes respectively forming each electrode pair inducing an electric field acting in a direction predetermined with respect to said horizontal scanning direction, upon application of a drive voltage therebetween, said electrode pairs being arranged such that each said shutter region is aligned in a vertical scanning direction that is perpendicular to said horizontal scanning direction;
driving means connected to each of said electrode pairs for applying said drive voltage to said electrode pairs independently;
biasing means connected to each of said electrode pairs for applying a d.c. bias voltage to the same; and
control means for inverting the polarity of said d.c. bias voltage that is applied to the electrode pairs;
second polarizing means provided in a path of the optical beam that has passed through the shutter array means for rotating the polarizing plane of the optical beam in a second, opposite angular direction with respect to said first polarizing means such that the polarizing plane of the optical beam that has passed through the second polarizing means crosses the polarizing plane of the optical beam that has passed through the first polarizing means substantially at a right angle;
deflecting means provided in a path of the optical beam that has exited from said second polarizing means for deflecting the same repeatedly in said horizontal scanning direction; and
focusing means for focusing the optical beam that has been deflected by the deflecting means on a recording medium.

8. An optical recording system as claimed in claim 7, in which said driving means supplies the drive voltage in synchronization with the scanning of the optical beam such that the optical beam that has passed through the shutter array means has a beam shape the size of which is changed in the vertical scanning direction.

9. An optical recording system as claimed in claim 8, in which said optical source produces the optical beam as an optical beam pulse with a variable pulse width in synchronization with the horizontal scanning of the optical beam.

10. An optical recording system for recording an image on a recording medium by means of an optical beam that is deflected repeatedly in a horizontal scanning direction, comprising:
beam source means for producing an optical beam with a polarizing plane that intersects with the horizontal scanning direction by an angle of 45 degrees in a first angular direction;
a first optical system provided in a path of the optical beam that has been produced by the beam source means for focusing the same at a first focal point to form an elongated optical beam having an elongated beam spot elongating in a vertical scanning direction that is perpendicular to said horizontal scanning direction;
shutter array means provided in correspondence to a first focal point, said shutter array means comprising a plurality of apertures aligned in said vertical scanning direction and are activated independently for selectively passing the optical beam therethrough upon activation;
the second optical system provided in a path of the optical beam that has passed through the shutter array means for focusing the same at a second location to form an elongated optical beam having an elongated beam stop elongating in said horizontal scanning direction;
deflection means for deflecting the optical beam that has passed through the second optical system repeatedly in said horizontal scanning direction;
a third optical system provided in a path of the optical beam that has been deflected by the deflection means for focusing the same on a recording surface of the recording medium; and
a slit element provided on a path of the optical beam that has exited from the second optical system, said slit element carrying a slit extending in the horizontal scanning direction with a width set to eliminate diffraction beams that are formed when the optical beam has passed through the shutter array means for the diffraction higher than the first order.

11. An optical shutter device as claimed in claim 1, in which said driver means energizes said electrode pair in response to an RF pulse, said RF pulse being given such that the RF pulse has a pulse width corresponding to a picture element to be recorded by the optical beam and a polarity the same as the polarity of the d.c. bias voltage in corresponding to an interval wherein the passage of the optical beam should occur and such that the RF pulse has an opposite polarity in the interval wherein the passage of the optical beam should not occur.

12. An optical shutter device as claimed in claim 1, in which said electro-optic layer is provided on a substrate of a thermal conductor, said substrate being provided with a cutout for passage of the optical beam and having an upper major surface and a lower major surface, said electro-optic layer being provided on said upper major surface of said substrate such that said array of shutter regions is in alignment with said cutout; and, said optical shutter device further comprises: a temperature sensor for detecting a temperature of said electro-optic layer, control means supplied with an output of said temperature sensor indicating the detected temperature and for producing a control signal in response thereto, and temperature regulation means provided on said substrate for regulating the temperature of said substrate in response to said control signal from said control means, said control means controlling the temperature of said substrate such that the temperature is held constant.

13. An optical shutter device as claimed in claim 12, in which said temperature sensor comprises a temperature sensor device that is contacted with said electro-optic layer for detecting the temperature thereof.

14. An optical shutter device as claimed in claim 12, in which said temperature sensor comprises an optical sensor for detecting an intensity of the optical beam that has passed through said cutout for passage of the optical beam and through said array of shutter regions.

15. An optical recording system as claimed in claim 10, in which said optical recording system further comprises a second slit element on a path of the optical beam that has exited from said shutter array means, said second slit element carrying a slit extending in a direction perpendicular to said horizontal scanning direction for eliminating the diffraction higher than the first order in the optical beam that has passed through the shutter array means.

16. A method for writing a pattern on an object by a focused optical beam one horizontal scanning line by one horizontal scanning line while controlling a passage of said optical beam through an electro-optic layer, said electro-optic layer being defined by a passage region for passing said optical beam and causing a rotation of a polarization plane of said optical beam upon application of a control voltage across said passage region, said method comprising the steps of:

applying a d.c. bias voltage across said passage region with a predetermined polarity;

inverting said polarity of the d.c. bias voltage periodically with a predetermined interval, wherein inverting the polarity of the d.c. bias voltage is achieved in each horizontal scanning interval that corresponds to the recording of one horizontal scanning line, said horizontal scanning interval including a recording interval for writing a pattern by the optical beam and a blanking interval wherein the optical beam is deactivated;

applying a pulse signal in correspondence to a pattern element that forms an element of said pattern to be written on the object, such that said pulse signal has a polarity coincident to the polarity of the d.c. bias voltage signal when said pattern element is to be written and such that said pulse signal has a polarity opposite to the polarity of the d.c. bias voltage signal when said pattern element is not written on said object;

detecting the number of times the electro-optic layer has passed the optical beam in each horizontal scanning interval;

comparing said number of times thus detected that the electro-optic layer has passed the optical beam in the current horizontal scanning interval with the number of times the electro-optic layer has passed the optical beam in the horizontal scanning interval that immediately precedes the current horizontal scanning interval; and causing the electro-optic layer to be in a state for passing the optical beam in correspondence to the blanking interval of the current horizontal scanning interval for a number of times such that the number of times the electro-optic layer has taken the state for passing the optical beam is identical in each horizontal scanning interval.

17. A method for writing a pattern on an object by a focused optical beam one horizontal scanning line by one horizontal scanning line while controlling a passage of said optical beam through an electro-optic layer, said electro-optic layer being defined by a passage region for passing said optical beam and causing a rotation of a polarization plane of said optical beam upon application of a control voltage across said passage region, said method comprising the steps of:

applying a d.c. bias voltage across said passage region with a predetermined polarity;

inverting said polarity of the d.c. bias voltage periodically with a predetermined interval, wherein inverting the polarity of the d.c. bias voltage is achieved in each horizontal scanning interval that corresponds to the recording of one horizontal scanning line, said horizontal scanning interval including a recording interval for writing a pattern by the optical beam and a blanking interval wherein the optical beam is deactivated;

applying a pulse signal in correspondence to a pattern element that forms an element of said pattern to be written on the object, such that said pulse signal has a polarity coincident to the polarity of the d.c. bias voltage signal when said pattern element is to be written and such that said pulse signal has a polarity opposite to the polarity of the d.c. bias voltage signal when said pattern element is not written on said object;

detecting the number of times the electro-optic layer has passed the optical beam in each horizontal scanning interval;

comparing said number of times thus detected that the electro-optic layer has passed the optical beam in the current horizontal scanning interval with a reference value; and causing the electro-optic layer to be in a state to pass the optical beam in correspondence to the blanking interval of the current horizontal scanning interval for a number of times such that the number of times the electro-optic layer has taken the state for passing the optical beam is identical in each horizontal scanning interval.

* * * * *